(12) United States Patent
Hill et al.

(10) Patent No.: US 6,775,046 B2
(45) Date of Patent: Aug. 10, 2004

(54) THIN FILM SHAPE MEMORY ALLOY REFLECTOR

(75) Inventors: Lisa R. Hill, Rancho Palos Verdes, CA (US); Gregory P. Carman, Los Angeles, CA (US)

(73) Assignee: Northrop Grumman Corporation, Los Angeles, CA (US); part interest ( * ) Notice: Subject to any disclaimer, the term of this patent is extended or adjusted under 35 U.S.C. 154(b) by 94 days.

(21) Appl. No.: 10/288,901

(22) Filed: Nov. 6, 2002

(65) Prior Publication Data

US 2004/0085615 A1 May 6, 2004

(51) Int. Cl.[7] .......................... G02F 1/01; G02B 26/00; G09G 3/20; H01Q 15/20; E05D 1/00
(52) U.S. Cl. .................. 359/288; 359/291; 359/298; 345/55; 345/102; 343/915; 16/225; 606/108
(58) Field of Search ................. 359/288, 290, 359/291, 298, 214, 223, 224; 345/55, 102, 108; 343/915, 912; 16/225; 606/108, 198, 200; 228/156; 264/510; 244/158 R (56) References Cited

U.S. PATENT DOCUMENTS

| | | | | |
|---|---|---|---|---|
| 3,391,882 A | * | 7/1968 | Johnson et al. ......... 244/158 R |
| 4,555,380 A | * | 11/1985 | Munakata et al. .......... 264/510 |
| 4,830,262 A | * | 5/1989 | Ishibe .......................... 228/156 |
| 5,644,322 A | | 7/1997 | Hayes et al. ................. 343/915 |
| 5,680,145 A | | 10/1997 | Thomson et al. ........... 343/915 |
| 5,825,275 A | | 10/1998 | Wuttig et al. ............... 337/139 |
| 5,846,247 A | * | 12/1998 | Unsworth et al. .......... 606/108 |
| 5,975,468 A | | 11/1999 | Moignier et al. ........... 244/173 |
| 6,075,200 A | | 6/2000 | O'Neill ...................... 136/246 |
| 6,137,454 A | | 10/2000 | Peck .......................... 343/912 |
| 6,175,989 B1 | * | 1/2001 | Carpenter et al. ............ 16/225 |
| 6,329,967 B1 | * | 12/2001 | Little et al. .................... 345/55 |
| 6,639,572 B1 | * | 10/2003 | Little et al. .................... 345/55 |

* cited by examiner

Primary Examiner—Loha Ben
(74) Attorney, Agent, or Firm—Ronald M. Goldman

(57) ABSTRACT

Reconfigurable radiant energy reflectors (3) of very low areal densities are formed of a laminate of a thin layer of a shape memory alloy (17) and a thin film or membrane material (15). The outer surface of the membrane provides the energy reflecting surface (16) and a support member (11) is attached to the laminate for application in a system. In a preferred embodiment, the shape memory alloy (17) is compositionally graded (18, 19, 29, 21) and exhibits a two-way shape memory effect and a heater (5) serves as the actuator to the reflector.

26 Claims, 5 Drawing Sheets

THIN FILM SHAPE MEMORY ALLOY REFLECTOR

FIELD OF THE INVENTION

This invention relates to reconfigurable light-weight reflectors of radiant energy, such as optical reflectors, microwave energy reflectors and the like, that have application in space satellites and, more particularly, to a very light-weight reflector of unique structure requiring minimal electronics and post deployment control of reflector shape.

BACKGROUND OF THE INVENTION

Reflectors have long been used to reflect radiant energy, energy traveling as wave motion, which encompasses visible light, infra red light, and radio and microwave frequency energy. Those reflectors have been applied in communication systems, detection and radiant energy exploration systems, and the like for redirecting incident radiant energy, such as found in antennas. Reconfigurable large aperture reflectors, twenty-five meters or larger in diameter, have particular application in space borne optical and radar equipment for the exploration of distant galaxies and the Earth. The large area of the reflector permits imaging of faint targets and coverage of larger areas of the Earth. As for any reflector intended for space borne application, a large aperture reflector must be able to fit inside a launch vehicle in a packed or folded condition, often within a volume and space prescribed by the space vehicle manufacturer, and deploy on orbit with repeatability and reliability. Launch weight is an additional factor and a very important one because of the impact on deployment cost. The greater the weight, the greater amount of fuel is required for the space vehicle to lift off and achieve orbit. The reflector must be light enough in weight for launch into orbit; and the lighter the weight of the reflector, the better.

The current state of the art in lightweight flight optics is in the four meter LAMP telescope that is believed to possess a reflector of an areal density of approximately 40 kg/m$^2$. The patented AstroMesh™ reflector, described in patent U.S. Pat. No. 5,680,145 and at the IEEE Antennas & Propagation Society (APS) International Symposium, July 1999, demonstrated areal densities of 0.5 kg/m$^2$, which serves as the present minimum of areal density for such reflectors. Despite those achievements, a demand and ready market awaits reflectors of even lower areal density if and when created.

The present large aperture space borne antennas of 25 meters diameter and larger are fabricated with lightweight compliant systems, such as thin film supporting a reflective surface, to permit small stowage volumes. Those reflectors can require distributed actuation and control for deployment and subsequent precision control of surface shape under a variety of space conditions, all of which requires electronic hardware. That actuation and control hardware is both complex and contributes significantly to the weight of the antenna system. For that reason alone any reduction of weight in actuation and control hardware for the deployable reflector is also desirable. Further, lessening the weight of the electronic control hardware allows reduction in manufacturing tolerances of the membranes and that is also desirable.

Reconfiguration of a stowed reconfigurable reflector to a fully deployed condition requires a deploying mechanism, referred to herein as an actuator. On command, the actuator mechanically moves the thin film reflector from a folded condition in which stowed to the deployed condition in which the thin film reflective surface of the reflector is spread over a large area. One known small size actuator that, until the present invention, has not been successfully combined as a component of a reconfigurable reflector, is a shape memory device. One form of the shape memory device comprises a shape memory alloy that is thermally actuated and that device has been employed heretofore as an actuator in switches and as pin pullers and the like, outside of reconfigurable reflectors.

The shape memory device contains a shape memory alloy film (as example, in the form of a strip or block) that possesses a "memorized" physical shape created on fabrication. That initial shape can be manually changed, reconfigured, from the memorized physical shape to a different one. Once manually reshaped, the alloy remains in the changed shape until the temperature of the alloy is raised above a transition or transformation temperature, characteristic to the alloy, wherein the alloy undergoes a metallurgical phase change from the martensite phase to the austenite. As example a strip of alloy that is fabricated as a flat strip, the memorized shape, may be rolled up into a coil, then remains as a coil until the temperature is raised above the characteristic transformation temperature. When the transformation temperature is attained, the strip uncoils on its own using stored energy and returns to the memorized flat shape. The physical transition occurs very fast, and is said to occur at a speed equal to about one-third the velocity of sound. The foregoing ability of a metal alloy to recover a particular surface shape when heated above a certain temperature alloys is referred to as a shape memory effect ("SME").

One known composition for the shape memory material is an alloy formed of the metals nickel and titanium (NiTi). One form of that alloy is a specific type of wire developed at the U.S. Naval Ordnance Laboratory, referred to as Nitinol. Such material exhibits a shape memory effect ("SME") only over a very limited range of proportions of the two metal components of the alloy. At one end of the range of SME the composition is formed of titanium rich material, as example, 51% titanium and 49% nickel. At the other end of the range of SME the composition is formed of a nickel rich material, as example, 51% nickel and 49% titanium. Each specific composition within the general range exhibits varied shape memory characteristics, identified by a varying transformation temperature. Outside the composition range, the alloy lacks SME. Other metal alloys, such as nickel titanium copper (NiTiCu), nickel titanium palladium (NiTiPd), and gold copper (AuCu), as example, also exhibit the SME and may be found in the technical literature.

NiTi exhibits the ability to recover large deformations, for example 10% strain, with a thermally induced phase transformation from martensite to austenite phases. Deforming the material at room temperature in the martensite phase causes a permanent deformation similar to the deformation of a copper wire, a ductile metal, when wound around one's finger. Unlike copper, however, when the NiTi is heated above the critical temperature ($A_f$), about 100° C. for a 51% Ti 49% Ni composition, the NiTi alloy transforms to the austenite phase and immediately springs back to the original (e.g. "memorized") shape. The large strains (e.g. distortions) of ten percent provided by the NiTi alloy (and other shape memory alloys) are adequate to fully deploy a membrane structure.

Once deployed in space, the reflector, typically, remains deployed. Usually, there's no need to, as example, to re-stow the reflector, and no thought is given to that end. As an advantage, the present invention introduces that additional capability. Further, although one might not consider re-stowing a space borne reflector, the present inventors recognize that other types of reconfiguration of a reflector may be desirable following deployment. As example, when a reflector is deployed in outer space, the reflector should exist in the three-dimensional geometric shape intended by the designer of the reflector, such as a parabola. Due to a mechanical fault or for reasons unknown, a surface portion of the reflector may be dented in or otherwise fail to assume the correct configuration or shape, whereby the performance of the reflector is adversely affected. Since the reflector is essentially inaccessible, it is not easy to change that incorrect configuration to the correct one. For that purpose, one may incorporate remotely controlled electromechanical actuators and/or the like at strategic locations on the reflector and make adjustments by remote control. But, for one, such actuators would greatly increase the weight of the reflector, are complicated to pack in with a stowed reflector and themselves introduce a series of devices that may be a source to other forms of failure. As an advantage, an aspect of the present invention addresses such adjustments of reflector configuration and provides for such reconfiguration.

A feature of some space borne reflectors is that the position of the reflector is set and may be changed by an electrical motor that is remotely controlled. By remote control the ground station operator is able to change the direction of the reflector, whereby the reflector may direct incident radiant energy to one location and then at other times redirect the incident radiant energy to a second location, a feature that is useful to some applications. Motors and the rotatable reflector posts for that function are generally heavy and take up space. Another advantage of the present invention is to serve a like function without requiring motors and rotatable posts further reducing the weight of the reflector.

Accordingly, a principal object of the present invention is to produce deployable reflectors that posses areal densities lower than 0.5 kg/m$^2$.

A further object of the invention is to advance the state of areal density of a reconfigurable large aperture reflector to an areal density of less than 0.1 kg/m$^2$, and even as low as 0.01 Kg/m$^2$.

A still further object of the invention is to reduce the weight of space borne configurable large aperture antenna systems by reducing or minimizing the amount of hardware necessary to control deployment and post deployment reflector shape.

Another object of the invention is to permit a previously deployed space borne reflector to automatically be reconfigured.

Still another object of the invention is to correct any distortions in the shape of a reflector, that is, reconfigure or "tweak" the shape, without using electromagnetic actuators.

Yet another object of the invention is to change the direction of reflection of incident radiant energy by a reflector without the use of electric motors and/or electromagnetic actuators.

Still another object of the invention is to provide a process for fabricating a reconfigurable reflector that possesses the capability of being changed from a stowed condition to a deployed condition and vice-versa.

And, an ancillary object of the invention is to provide a process for manufacturing shape memory alloy reflectors that possess a two-way shape memory effect.

BRIEF SUMMARY OF THE INVENTION

In accordance with the invention, a reconfigurable reflector is formed of a laminate of thin film material and a thin layer of a shape memory alloy, with the laminate containing a reflective surface. The laminate is configured in one geometry while the reflector is in the stowed condition and the temperature remains below the transformation temperature of the shape memory alloy, and transforms or deploys to a second deployed geometry, in which the reflective surface of the reflector is fully expanded when the temperature is at or above that transformation temperature. Means are provided to heat the reflector to at least the transformation temperature when reflector deployment is desired. In accordance with a specific aspect to the invention, the latter means comprises an electric heater.

In accordance with another aspect to the invention, the foregoing shape memory material is of the two-way type, wherein withdrawal of heating results in the reflector returning to the stowed condition once the temperature of the reflector falls below the transformation temperature. For that two-way type shape memory material, the layer of shape memory material comprises a compositionally graded layer of shape metal alloy, which in the preferred embodiment ranges in grade from 49% nickel and 51% titanium to 51% nickel and 49% titanium and, in thickness, in the range of five and twenty microns.

Further in accordance with the invention, a new method is presented for constructing a reflector that includes draping a reflective membrane onto a support surface inside a sputtering chamber, that support surface defining the geometry of the reflector in the deployed condition, with a reflective surface of said reflective membrane being oriented face down against said support surface; and then sputtering a shape memory alloy onto the outer surface of said reflective membrane to cover said surface and produce a laminate assembly, the outer surface of said reflective membrane being opposite to said reflective surface.

In accordance with a specific aspect of the foregoing method the sputtering process accomplishes compositional grading of the shape memory alloy, specifically a two-metal alloy that exhibits the shape memory effect. The procedure for obtaining that grading during sputtering is to heat the metal alloy that supplies the metal atoms to the plasma to a predetermined temperature and thereafter increment that heating (and temperature) in steps at defined intervals. Suitably, the initial temperature is selected so that the alloy composition sputtered onto the membrane falls at one end of the range of shape memory effect of the alloy and the final temperature is selected so that the sputtered composition of the outer surface of the shape memory alloy is at the other end of that range.

The foregoing and additional objects and advantages of the invention, together with the structure characteristic thereof, which were only briefly summarized in the foregoing passages, will become more apparent to those skilled in the art upon reading the detailed description of a preferred embodiment of the invention, which follows in this specification, taken together with the illustrations thereof presented in the accompanying drawings.

DETAILED DESCRIPTION OF THE INVENTION

Figure 1:
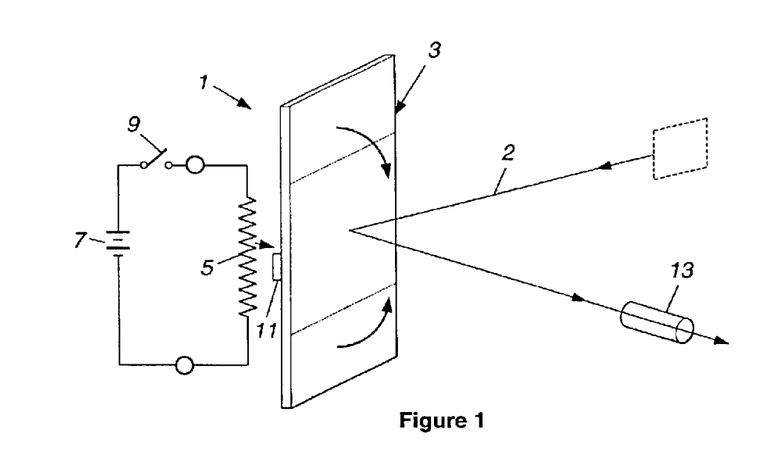
FIG. 1 is an embodiment of a reflector shown in the deployed state.

One embodiment of a deployable reflector in accordance with the invention is pictorially illustrated in FIG. 1, to which reference is made. The deployable reflector 1 contains the reflector surface 3, also referred to as a reflector, an electric heater 5, a power source 7, a switch 9 and a support member 11 for reflector 3. Other mechanical supports that connect to support member 11 and support reflector 1 to a space vehicle or stationary location, as example, are not necessary to an understanding of the invention and are not illustrated. Reflector surface 3 is formed of a laminate of a shape memory alloy and a membrane or film material, more fully described elsewhere herein. The reconfigurable reflector is illustrated in the fully deployed condition or state, also referred to as the high temperature state because of the inclusion of shape memory material. Being fully deployed, reflector surface 3 is maintained at a temperature that is above the transition temperature of the shape memory alloy. With switch 9 closed, electric current is supplied from the DC power source 7 to electric heater 5. That heater heats the reflector above the transformation temperature and maintains that temperature, thereby maintaining the reflector in the flat shape illustrated.

An optical receiver 13 that functions as part of the system combination is included for completeness. That receiver is focused on the front surface of reflector 3. The reflector 3 contains a flat mirror like reflective surface that, in this example, reflects light. Incident light 2, represented in dotted lines, that originates from a remote source, not illustrated, such as a transmitter of a communication system, reflected light from an object, or the sun, depending upon the application in which receiver 13 is employed, impinges upon the mirror-like surface and is reflected into the input of receiver 13. In turn, the receiver translates the received light into electronic signals that are outputted to conventional signal processing equipment, not illustrated.

Figure 2:
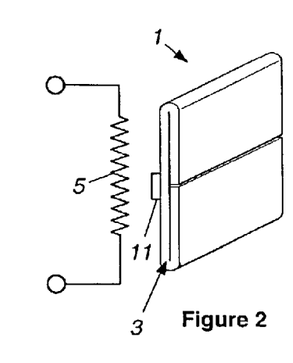
FIG. 2 is the embodiment of FIG. 1 shown in the stowed state.

FIG. 2 illustrates the reflector in the stowed (e.g. undeployed) state. Because of the inclusion of shape memory material that state may also be called cold temperature state. In that state the two outer portions of the reflector are folded over against a middle portion, in which the reflective surface is covered. The power source 7 and switch 9 are not illustrated in the figure, but are not in use in the stowed state. The power switch is open and no electricity is being supplied to heater 5. Hence, no heat is being generated. The reflector is cooled to the temperature of the ambient, which is below the transformation temperature of the shape memory alloy component.

By design heater 5 is closely thermally coupled to the reflector surface 3. When heater 5 is energized, by design, the heater generates sufficient heat to raise the temperature of the reflector above the transformation temperature of the shape memory alloy component, and maintains that temperature. Since the shape memory alloy exhibits the SME, once the transformation temperature is attained, the overlapping outer portions of reflector surface 3 spring open and rotate outward (e.g. reconfiguring) until those portions, together with the middle portion, produce the straight flat reflector earlier illustrated in FIG. 1. The reconfigurable reflector is then fully deployed. If after being deployed, as in FIG. 1, one desires to re-stow the reflector, the reflector may be reconfigured to the undeployed state, as in FIG. 2, by opening switch 9 and terminating current to heater 5. Being deenergized, the heater no longer generates heat and the reflector 3 begins to cool to the lower temperature of the ambient. As the temperature drops below the transformation temperature, the two end portions of the reflector essentially quickly fold back over to the position shown in FIG. 2.

The shape of the reflector shown in FIG. 1 is the high temperature or "memorized" shape of the shape memory alloy that backs the reflector 3. That memorized shape is the shape in which the shape memory alloy was fabricated onto the aluminized membrane or film at the front surface. The shape of the reflector shown in FIG. 2 is the cold temperature state. That shape is one in which the reflector was manually formed, such as by pounding or pressing, following fabrication of the shape memory alloy on the film membrane.

It is recognized that the shape memory alloy and membrane material is overall a very thin member. In a gravity environment, such as on the surface of the Earth, a laminate of those materials may not be self supporting. However, in the weightlessness (or lower gravity) of outer space, the small forces produced by the shape memory material are sufficient to maintain the reflector surface deployed in the desired shape. It is also recognized that electric heater 5 may be in a different form than the one illustrated. As example a grid heater wires or a heater wire may be directed integrated into the side of the reflector forming a serpentine path on the backside of the reflector. Such a heater wire arrangement may be bonded to the reflector by epoxy, as example, or other known means. Further, instead of the electric heater, a heating laser may be incorporated in the reflector system used to apply radiant energy sufficient to heat the surface of the reflector to the appropriate temperature (but not damage that surface), such as later herein described in connection with another embodiment of the invention.

Figure 3:
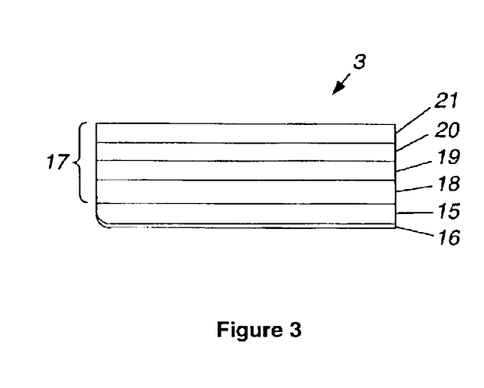
FIG. 3 illustrates the laminate structure of the reflector of FIG. 1.

In this embodiment, reflector 3 is constructed of a compositionally graded shape memory alloy that is formed on a lightweight membrane, forming an integral or laminate structure, which is illustrated in a not-to-scale enlarged section view in FIG. 3, to which reference is made. By designers choice, the reflector is formed in the geometry of a flat sheet, as earlier depicted in FIG. 1, instead of some other possible geometrical shape. The structure includes the thin membrane 15 that contains a reflective surface 16 on the front side, and a compositionally graded metal alloy layer or film 17 on the rear side.

Compositionally graded means that the shape memory alloy is formed or deposited in a manner in which a different compositional mix of the metals exists continuously throughout the thickness of the alloy and appears as a continuous linear change as a function of the height of alloy 17. As one realizes such grading is equivalent to building up the thickness of the film of shape memory alloy as an infinite number of discreet layers, each of which differs slightly from the preceding layer in a regular way, as example, slightly more titanium and slightly less nickel in the nickel titanium alloy. As one appreciates, it may be possible to obtain the appropriate shape memory effect desired for a reflector without full compositional grading (or with less than an infinite number of layers) with some large number of layers of the alloy, but the present inventors have not verified that possibility through appropriate trial and error experiment as of the date of filing the present application. However, solely for the purpose of permitting the reader to more quickly understand the invention, the section of the shape memory alloy illustrated in FIG. 3 is limited to four layers.

By way of an extreme example, the shape memory alloy film 17 is built of four layers, 18, 19, 20 and 21 of an alloy containing the same two metals, but in different percentages of the two, and all of the compositions of alloy must be within the range in which the alloy exhibits the SME. As example, a preferred shape memory alloy for a practical embodiment of the invention is nickel and titanium metals. To give the reader the gist of the structure, as example, at one end of the range of SME, the alloy may be formed of 49% nickel and 51% titanium. At the other end of the range of SME the composition may be formed of 51% nickel and 49% titanium. Then the first layer 18 comprises 49% nickel and 51% titanium, the second layer 19 comprises 49.67% nickel and 50.33% titanium, the third layer 20 comprises 50.34% nickel and 49.66% titanium and the fourth or upper layer comprises 51% nickel and 49% titanium. For any particular embodiment one may experiment with the compositions to find the optimum values for the beginning and end points, the rate of change of composition versus the depth of the layer, and the processing controls necessary to achieve that change. Further, if considering the compositional grading as a very large number of discrete layers, one may determine the minimum number of layers needed and the rate of composition change with the layer to accomplish the designer's goals.

A number of light weight reflective membranes or films have served as a structural part of a reflector. One is a thin membrane polymer known as CP-1, an optical quality space-qualified polymer that is commercially available from the SRS Technologies company of Huntsville, Ala. The polymer film is coated with aluminum, that is, contains an aluminized surface, that provides a reflective surface to the film. That surface is reflective over a great portion of the energy spectrum, from optical energy to R.F. Another is NiTi. NiTi exhibits a reflectivity similar to that of aluminum and is reflective over the spectrum of infra-red, visible light, VHF radio frequencies and UHF radio frequencies. Preferably, the reflective layer is aluminum and the film in that instance is CP-1 polymer. Thin films used in the construction of the reflector, preferably, are thirty microns or less in thickness.

Figure 4:
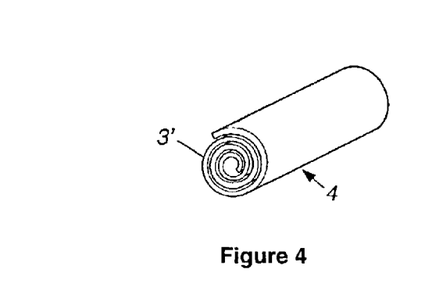
FIG. 4 shows an alternative state in which the reflector of FIG. 1 may be placed in a stowed condition.

Below the transformation temperature of the SMA, the sheet of thin film SMA can be manually bent or distorted into any other geometrical configuration. As example, the sheet may be rolled up, like a roll of paper toweling, as illustrated in FIG. 4, or anything else. The material then remains in that geometrical configuration, until the temperature of the material is raised to the transition temperature, as was earlier described. For the embodiment of FIGS. 1 and 2, the ends of the sheet are folded over manually to form the configuration of FIG. 2 as the un-deployed state. Once folded over, the support bar or structure 11 is attached to the rear side of the reflective surface 3, that is, to the non-reflective side of the reflector, suitably by an epoxy bond.

Films of SME material typically exhibit a shape memory effect that is only one-way. That means the memorized shape is recovered by heating, but subsequent cooling does not cause the material to automatically deform back to that cold temperature shape. An external force must be applied to return the material to the cold temperature shape. To create the two-way memory effect a biasing force is required to reshape the SME film when the film is cooled down. Such a biasing force was achieved previously by "tailoring" precipitates in a thick plate, resulting in a plate that curled during the cold, martensitic phase and then flattened out when heated.

Applicant's also recognized that a two-way effect in an SME material, an effect in which the SME material automatically switches or transforms between two shapes solely due to heating and cooling, is accomplished by compositional grading of the shape memory alloy, and recognized that such compositionally graded material may be formed on a polymer film to define a reflector. SME material that is compositionally graded is available from the Shape Change Technologies company of Thousand Oaks, Calif. That two-way effect (and the compositionally graded material and process for reflectors) is included in the principal reflector embodiments presented herein. The two-way effect is believed desirable, even in a space borne reflector, and ideally should find more specific reflector applications in the future. The two-way effect of the SMA may also find applications other than as a simple reflector. As example, for space applications one configuration may comprise a solar sail or communication antenna, and in the other configuration a solar array.

Figure 5:
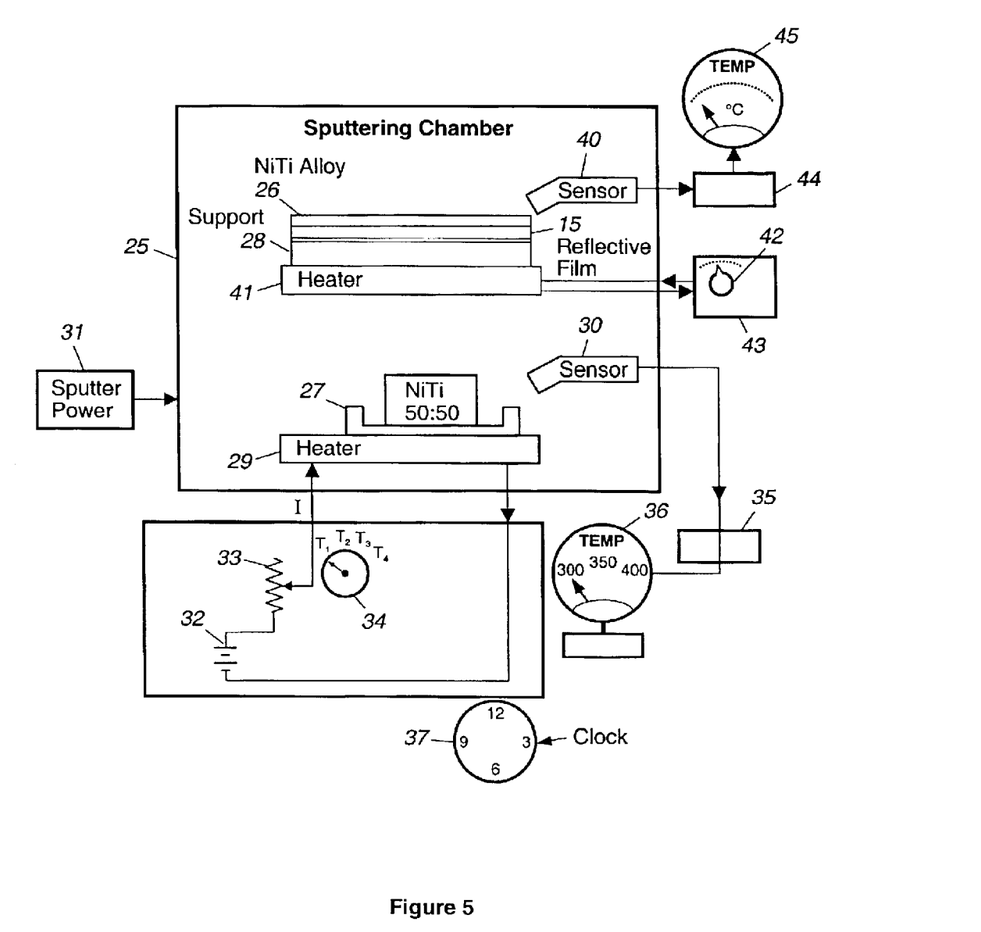
FIG. 5 shows the process of manufacturing the reflector surface.

One process for fabricating the SMA film of FIG. 3 is by a sputtering process, as pictorially illustrated in FIG. 5 to which reference is made. Sputtering is a known process for removing atoms of metals from a source of the metal and depositing the atoms on a target. In a gaseous atmosphere through a large potential difference a gas plasma is created that removes atoms of metal from a metal body, often referred to as the "target", inside the chamber and deposits those atoms on another member, often referred to as the "substrate." The quantity of metal atoms deposited on the target depends upon the temperature of the target. As those skilled in the art appreciate other less preferred methods of fabrication of the SMA film are known to those skilled in the art and new methods may be created in the future. As the skilled persons should further appreciate, the new reflectors using the SMA film are not dependent on the particular process for producing the SMA film.

A sputtering chamber 25, large enough to accommodate the size of the particular film that one desires to produce. As example, if the reflector is twenty-five feet in diameter or has any dimension of that length, the chamber must be still larger in size, while smaller size SMA films will require a smaller size chamber. Depending on the size of the film, it may be necessary to construct sputtering chamber in sizes not previously known or needed. Alternatively, it is possible to employ smaller sputtering chambers that hold only a small portion of the reflector membrane and construct the reflector in sections. Each section of the reflector may be fabricated in the small sputtering chamber and after all sections have been fabricated they are seamed together. That seaming may be accomplished in a variety of ways, one of which is to overlap the sections and fuse the sections together by heating. The SRS company of Huntsville, Ala. is one that is available to fuse CP-1 membrane material.

Sputtering chamber 25 contains a sputtering dish 27, a support 28, electric heaters 29 and 41, temperature sensors 30 and 40 and a source of sputtering power supply 31. Heater 29 is connected in circuit with a controlled source of electric current external to the chamber, represented by DC battery 32, rheostat (variable resistance) 33, that is calibrated in terms of temperature levels, T1, T2, T3, T4 and up. By changing the position of the control knob 34 to the rheostat, the temperature of the heater 29 may be changed, hence, the temperature of dish 27 and the metal contents of that dish.

Temperature sensor 30, which may be of the infra-red type is connected to a conventional conversion circuit 35 that converts the light received to an appropriate voltage or current output and applies that output to a meter 36 that is calibrated in temperature. The level of output voltage or current is converted by the meter to the display of the temperature of the target in dish 27. The feedback provided by the sensor allows the operator to ensure that the temperature desired by the setting of control knob 34 of the rheostat is at the correct level, and, if not, to make any necessary adjustment to the rheostat setting. A clock 37 is also included to enable the operator to time the operations next described. The foregoing is a basic control arrangement for the sputter chamber and requires the operator to monitor and control the sputtering operation.

Heater 41 is connected to another source of heater current 43, located externally of the chamber. By changing the position of control knob 42, the temperature of heater 41 may be changed, hence, the temperature of support 28 and that of the reflective film 15 that is placed on the support. A temperature sensor 40, which also may be of the infra-red type, is connected to another known conversion circuit 44 that converts the light received to an appropriate voltage or current output and applies that output to a meter 45 that is calibrated in temperature. The level of output voltage or current is converted by the meter to the display of the temperature of the shape memory alloy 26.

As known, the temperature at which the target is maintained influences the composition of the alloy that is deposited on the substrate during sputtering. As example, if the block of metal in dish 27 is a titanium nickel alloy of 50% titanium and 50% nickel, and that target is at room temperature during the sputtering process, the alloy deposited on the substrate will be different in composition, namely, 48% titanium and 52% nickel. If the target is at 100 degrees C. during the sputtering process, then the composition of the deposited alloy will be 49% titanium and 51% nickel. And if the target is maintained at a temperature of 200 degrees C. during the sputtering process, the deposited alloy will be 50% titanium and 50% nickel.

As also known, the temperature of the substrate affects the residual stresses of the deposited alloy, including an influence on the transformation temperature of the shape memory alloy deposited on the substrate. The nature of that influence is determined principally through trial and error. Those relationships do not appear to be material to the present invention, but are well known to those who manufacture such shape memory alloys, such as the Shape Change Technologies company, referred to earlier. As those skilled in the art appreciate, heater 41, sensor 40 and accompanying apparatus 43, 44 and 45 are included to illustrate a sputtering apparatus that is more general in nature and to point the way in which the characteristics of the reflectors produced may be optimized and refined through experimental trial and error. Notwithstanding, it should be appreciated that embodiments of the invention may be manufactured without employing substrate heating. For purposes of this description, thus, heater 41 will remain unenergized and the temperature of the substrate will therefore not be controlled.

In this embodiment of the sputtering operation, dish 27 contains a nickel titanium alloy of 50:50 composition, the reflective membrane 15, the substrate, is placed on support 28, and drapes onto the support; the support is placed in the chamber 25 and the chamber door, not illustrated, is closed. Heater 29 is operated to the temperature set on the rheostat and the sensor meter 36 is monitored. Once the desired temperature is attained, clock 37 is actuated, sputter power 31 is actuated and sputtering of the metals begins. Metal ions are drawn to and are deposited on film membrane 15.

Following the lapse of a predetermined interval as viewed on clock 37, the operator changes the rheostat to the next specified temperature level which the operator may monitor at meter 36 and the deposit of the two metals continues. The relative composition of the alloy layer 26 being deposited on membrane is some function of the temperature at which the target is maintained. At present the target temperature versus composition of the alloy characteristic is determined through trial and error. In the foregoing steps, the first layer of the graded composition was formed, and the overlying second layer is being formed. At the lapse of the next prescribed interval as viewed on the clock, the operator again raises the temperature and resets the clock, allowing the third layer of the alloy to be deposited. The same procedure is applied for the fourth layer.

As an example of the sputtering process for the foregoing four layers, which produces a poorly compositionally graded shape memory alloy, the layers may be sputtered as follows:

| (layer | target temperature | duration) |
|---|---|---|
| 1 | 200 degrees C. | 5 minutes; |
| 2 | 300 degrees C. | 5 minutes; |
| 3 | 400 degrees C. | 5 minutes; and |
| 4 | 500 degrees C. | 5 minutes. |

Figure 6A:
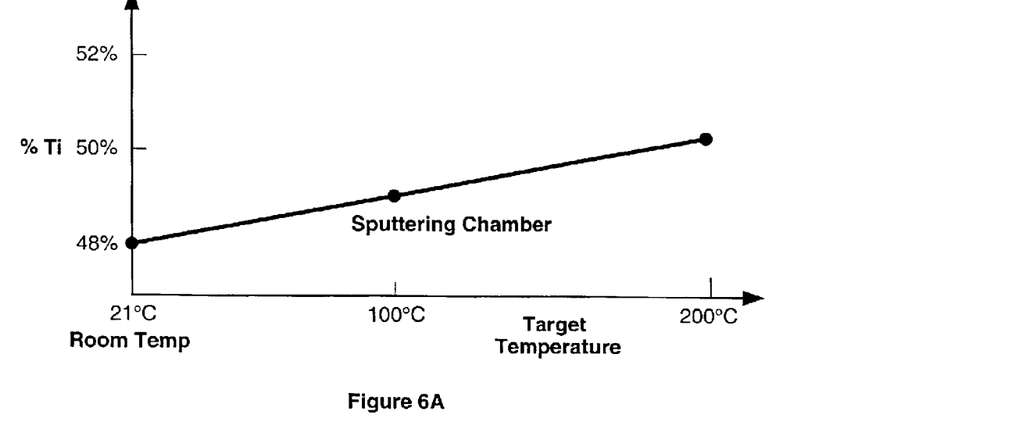
FIGS. 6A and 6B are graphical illustrations of the change in composition of the shape memory alloy with height during sputtering processes.
Figure 6B:
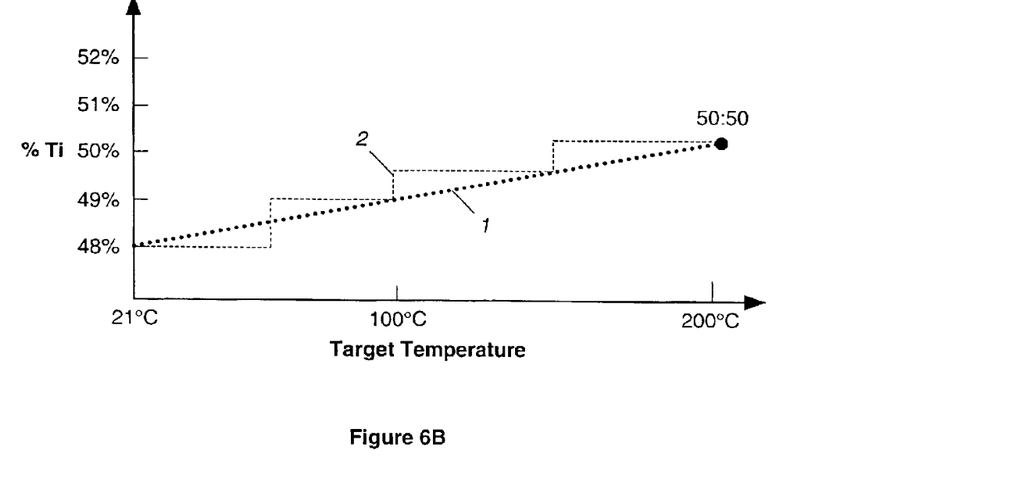

To achieve full compositional grading using the foregoing sputtering apparatus, the operator should continuously turn the rheostat at a set rotational rate between the start and end temperatures during the sputtering process. That would produce a continuous change in the alloy composition that changes with the height of the layer, such as illustrated graphically, but not to scale, in FIG. 6A. Should the interval at which the rheostat is turned a notch each time be a very short interval, so that in total a very large number (near infinite number if possible) of steps in temperatures of the target occurs between the beginning and end temperatures, then the alloy composition contains changes that occur in very small steps, as illustrated by curve 1 in FIG. 6B. With the four steps in the given example, the change between different heights in the alloy layer is substantial, resulting in a poor compositional grading, as illustrated by curve 2 in FIG. 6B.

The monitor and control system illustrated for the sputtering chamber is recognized as basic or elementary. More sophisticated monitor and control systems may be employed as desired, particularly for high volume production. As example, the foregoing sputtering process may be controlled by a programmed computer, and sensors that connect to that computer, as example, through an IEEE port. The desired temperatures can be set by the operator in programming the computer as well as the running time for sputtering for each layer. The temperature sensor can be connected as well to the computer and temperature monitoring and control software can allow the computer to check the temperature sensor and automatically adjust the temperature control as appropriate.

Since reflector 3 in FIG. 1 is flat, support 28 used in the foregoing sputtering process is also a flat surface. Other reflector shapes may be fabricated by the sputtering process should be recognized as being included within the scope of the present invention. Thus, should one desire the memorized shape of the SMA to be parabolic in geometry for a parabolic reflector, then a different target support having a three dimensional parabolic surface should be employed instead of the one with the flat surface.

As one appreciates the reflective membranes or films employed in the foregoing sputtering process must be able to withstand the high temperatures used in that process. It will be found that the films or membranes referred to earlier in this specification, such as the membrane polymer known as CP-1, survives those sputtering temperatures. It should be recognized that the invention is not limited to those practical examples. Through investigation, membranes of other material might be found that are also suitable for the sputtering process, and also fall within the scope of the invention.

The foregoing sputtering process formed the shape memory material over the reflective film. As those in the art appreciate the invention is not limited to that procedure. An alternative fabrication process is to first sputter the shape memory onto the shaped support or mold (or over a suitable release agent on that mold) and thereafter drape or otherwise form the reflective film on top of the shape memory material. Indeed, although sputtering is the only process presently known for producing a compositionally graded shape memory alloy (or, indeed, for forming large numbers of layers of different composition as earlier described), it is possible that alternative fabrication processes will be discovered in the future that can be applied to construction of the present invention.

As a further alternative, the separate electrical heater used in the reflector embodiment of FIGS. 1 and 2 may be replaced by one that is integral (and integrally formed within) the membrane of the reflector or in the shape memory layer. That is, thermal actuation of the shape memory material may be achieved by passing a small current through the film membrane to heat the SMA resistively. This may be achieved by embedding resistive traces in the surface of the membrane, or by making the membrane of electrically resistive material, and passing an electrical current through such structure to produce the $I^2R$ losses, heat.

The reflector of FIGS. 1 and 2 uses an electrically operated heater to deploy the reflector. In a deployment system for outer space, actuation of the SMA may be achieved with a minimum of electronics by using direct exposure of the SMA to the sun or with laser energy. As example, the stowed reflector may be moved out of the space craft and positioned in the intense rays of the sun. With an appropriate temperature characteristic to the shape memory alloy, the exposure to the intense radiation of the sun produces heating that raises the alloy to the temperature at which the reflector fully configures to the deployed condition. Laser energy is next described.

Figure 7:
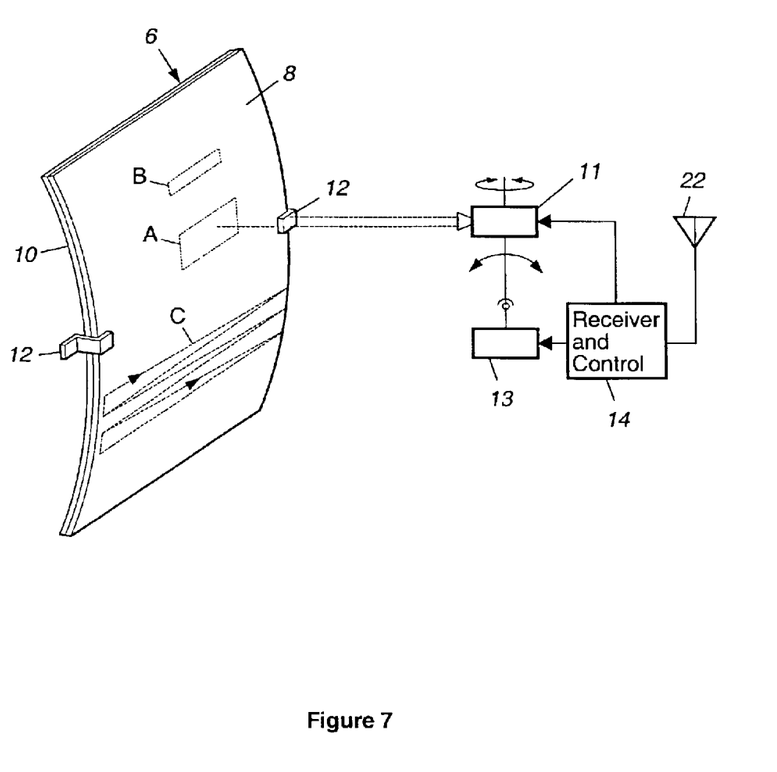
FIG. 7 is a pictorial illustration of another embodiment of the reflector that employs a laser to produce a change in reflector configuration to change the direction of reflection of a reflector and/or to correct the optics of a reflector.

Reference is made to FIG. 7, which partially illustrates another embodiment of the invention in which a ground base remote controlled heating laser is used to bring about changes in a deployed reflector in space borne application. In this embodiment, a curved reflector 6 comprising the layer of smart memory alloy 8, such as that earlier described, formed on a film layer 10, which contains a radiant energy reflective surface, not visible in the figure. The film layer and the alloy layer are formed together in an integral one piece structure.

As deployed reflector 8 is concavely curved with the reflective surface facing outward with the backside exposed to view in the figure and is mounted by support members 12 to the space vehicle, not illustrated. As in the prior embodiment the reflector is employed in a system which receives radiant energy from a remote source, not illustrated, and reflects that energy to a radiant energy receiver, also not illustrated. A heating scanning laser 11 is mounted in the space vehicle facing the shape memory layer 8. The laser is coupled to a positioning motor 13 which controls the tilt and lateral direction of the laser. Both the positioning motor and laser are controlled by a receiver controller 14.

In operation, command signals from the ground station direct the orientation and output of laser 11. As example, the command signal may be such as to focus the laser on the patch A indicated in dotted lines on layer 8. To do so the laser beam covers that area either directly if the beam is wide enough or by scanning over that region, raising the temperature of that region. That temperature is raised to the level wherein the shape memory alloy changes in shape. As a consequence of that change, and, as known to the ground controllers, the curvature of reflector 6 changes in configuration from the condition as deployed to another known condition, such as illustrated pictorially in FIG. 8 to which reference is made.

Figure 8:
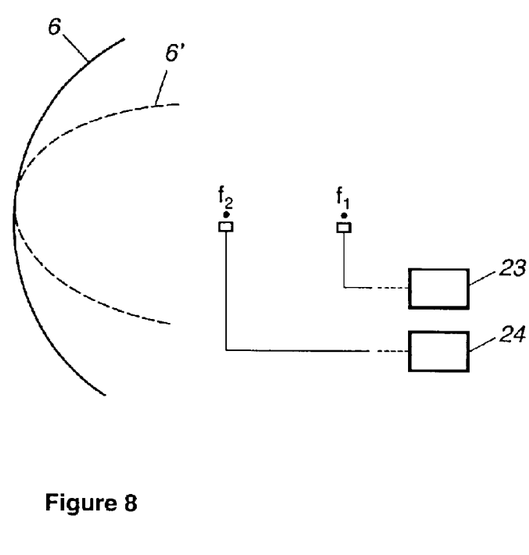
FIG. 8 pictorially illustrates one type of change in reflector geometry that may be accomplished with the embodiment of FIG. 7 to redirect radiant energy.

In FIG. 8 the initial configuration of the reflector 6 is of a relatively wide parabolic curve with a focal point f1. The reflector directs incident radiant energy to that focal point. The input of a first radiant energy receiver 23 is located at that focal point and receives that energy. Following the heating of patch A, the reflector is reconfigured to a more narrow parabola in shape 6'. With that new geometry, the reflector defines a new focal point f2, and the radiant energy incident on the reflector is directed to that focal point. The input of a second radiant energy receiver 24 is located at focal point f2 and now receives that energy. Effectively, through appropriate actuation of the shape memory material, the direction of the reflector may be changed.

Figure 9:
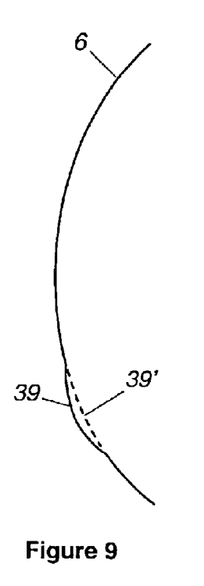
FIG. 9 pictorially illustrates a second type of geometric change in reflector geometry that may be accomplished with the embodiment of FIG. 7 to correct the optics of a reflector.

Returning to FIG. 7, as another example the command signal may be such as to focus the laser on the patch B indicated in dotted lines on layer 8. For the purpose of this example it is assumed that reflector 6 as deployed contains an aberration in the surface for unanticipated reasons. That surface aberration produces an error in optics in which not all of the incident energy is reflected to the desired focal point. As example this circumstance is illustrated in FIG. 9 to which reference is made. As shown, reflector 6 contains a depression 39 in the surface.

As known to the ground controllers, the depression 39 may be removed and the proper curvature of the reflecting surface of reflector 6 restored by changing the shape of the shape memory alloy at the location of patch B. The ground controller issues the proper command signal, which is received at receiver controller 14 and the latter positions the positioning motor 13 to direct laser 11 at patch B and initiate operation of the laser. To do so the laser beam covers that area either directly if the beam is wide enough or is accomplished by scanning over that region. The beam of the heating laser raises the temperature of that region of the shape memory alloy. That temperature is raised to the level wherein the shape memory alloy changes in shape. As a consequence of that change, the depression 39 is removed and the reflector surface properly shaped as pictorially illustrated in FIG. 9 as 39'.

Earlier in this description, laser heating was mentioned as an alternative to thermal heating in some instances. Reference is again made to FIG. 7. Scanning heating laser 11 can be commanded to sweep or scan over a large area of the shape memory alloy surface of the reflector as represented at C in the figure. That representation is of a raster-scan type sweep and covers a wide area of the reflector. It is possible to sweep the laser over a majority of the surface of the reflector rapidly enough to heat all portions sufficiently to produce a reconfiguration of the reflector. As should be appreciated, the foregoing actions described in connection with FIGS. 7–9 are not fully engineered or quantified, but provide sufficient guidance to those skilled in the art to attain that end.

Although the foregoing reflector construction was motivated by a desire to construct deployable reflectors of large aperture and very low areal densities, as those skilled in the art appreciate, however, the disclosed reflector construction can also be applied to smaller size reflectors as well. Those smaller reflectors will also benefit to some extent from the lower areal densities achieved. The invention should be construed to include such applications.

As should be understood from the foregoing description the term reconfiguration encompasses all changes in the configuration of the shape of the surface of the reflector, including the change in configuration from a stowed condition to a fully deployed condition; a change in the shape of a portion of the reflective surface of a deployed reflector to correct the shape from an incorrect one and thereby correct the optics of the reflector; and a change in the shape of the reflective surface of a deployed reflector to change the direction in which the reflective surface reflects incident energy, such as a change in the focal point of a parabolic antenna.

It is believed that the foregoing description of the preferred embodiments of the invention is sufficient in detail to enable one skilled in the art to make and use the invention without undue experimentation. However, it is expressly understood that the detail of the elements comprising the embodiment presented for the foregoing purpose is not intended to limit the scope of the invention in any way, in as much as equivalents to those elements and other modifications thereof, all of which come within the scope of the invention, will become apparent to those skilled in the art upon reading this specification. Thus, the invention is to be broadly construed within the full scope of the appended claims.

What is claimed is:

1. The method of redirecting radiant energy originating from a remote source comprising the steps of:
    placing a shape memory alloy containing a radiant energy reflective surface of a first configuration in a position to receive incident radiant energy from said remote source; and
    changing the shape of said radiant energy reflective surface to a second configuration to reflect incident radiant energy in a direction different from said first configuration.

2. The method of redirecting radiant energy as defined in claim 1, wherein said step of changing the shape of said radiant energy reflective surface to a second configuration comprises the step of applying energy to said shape memory alloy.

3. The method of redirecting radiant energy as defined in claim 2, wherein said step of applying energy to said shape memory alloy further comprises applying heat energy to said shape memory alloy.

4. The method of redirecting radiant energy as defined in claim 3, wherein said step of applying heat energy to said shape memory alloy includes: pointing a laser at said shape memory alloy and directing a laser beam output from said laser onto said shape memory alloy.

5. The method of redirecting radiant energy as defined in claim 4, wherein directing a laser beam output from said laser onto said shape memory alloy includes scanning said laser beam over a surface of said shape memory alloy.

6. The method of redirecting radiant energy as defined in claim 4, wherein directing a laser beam output from said laser onto said shape memory alloy includes the step of directing said laser beam over a predetermined portion of said surface of said shape memory alloy.

7. The method of redirecting radiant energy as defined in claim 3, wherein said step of applying heat energy to said shape memory alloy includes: applying a heating current to a heater coupled to said shape memory alloy.

8. A reconfigurable reflector for space vehicle application, comprising:
    a thin layer of film material, said layer of film material containing front and rear surfaces and being of a predetermined surface geometry;
    said front surface of said thin layer containing a reflective surface for reflecting radiant energy;
    a thin layer of a shape memory alloy sputtered onto and covering said rear surface of said layer of film material and defining therewith a unitary one-piece laminate film structure having said geometry of said thin layer of limp film material;
    said shape memory alloy having a predetermined transformation temperature
    said unitary one-piece laminate film structure being manually deformable into a second shape different from said predetermined geometry, wherein said unitary one-piece laminate film structure is retained in said second shape following manual deformation so long as the temperature of said unitary one-piece laminate film structure remains below said predetermined transformation temperature; and
    said unitary one-piece laminate film structure being capable of restoring to said predetermined geometry from said second shape when said temperature of said unitary one-piece laminate film structure is raised to said transformation temperature.

9. The reflector for space vehicle application as defined in claim 8, wherein said shape memory alloy comprises a nickel titanium alloy.

10. The reflector for space vehicle application as defined in claim 8, wherein said film material comprises CP-1.

11. The reflector for space vehicle application as defined in claim 8, wherein said film material comprises a polymer.

12. The reflector for space vehicle application as defined in claim 8, wherein said layer of shape memory alloy comprises a compositionally graded layer of a two component metal alloy in which the percentage of a first component metal in said alloy increases as a function of the height of said layer of shape memory allow.

13. The reflector for space vehicle application as defined in claim 12, wherein said shape memory alloy comprises a nickel titanium alloy, and where said percentage of said titanium in said alloy is 51 percent at the bottom side of said layer of shape memory alloy and said percentage is 49 percent at the upper side of said layer of shape memory alloy.

14. The reflector for space vehicle application as defined in claim 12, further comprising: an electric heater in heat energy coupling relationship with said laminate film structure; and switching means for generating heat, said switching means having a closed position for applying electric current to said electric heater, wherein said electric heater generates sufficient heat to raise the temperature of said laminate film structure above said transformation temperature, and an open state for interrupting electric current to said electric heater and discontinue generation of heat, wherein the temperature of said reflector falls below said transformation temperature.

15. The reflector for space vehicle application as defined in claim 14, further comprising: a receiver of radiant energy, said receiver including an input, said input of said receiver being focused on said reflector for receiving radiant energy reflected from said reflector.

16. The reflector for space vehicle application as defined in claim 15, wherein said shape memory alloy comprises a nickel titanium alloy, and where said percentage of said titanium in said alloy is 51 per cent at the bottom side of said layer of shape memory alloy and said percentage is 49 per cent at the upper side of said layer of shape memory alloy.

17. The reflector for space vehicle application as defined in claim 8, further comprising: an electric heater in heat energy coupling relationship with said laminate film structure; and switching means for generating heat, said switching means having a closed position for applying electric current to said electric heater, wherein said electric heater generates sufficient heat to raise the temperature of said laminate film structure above said transformation temperature, and an open state for interrupting electric current to said electric heater and discontinue generation of heat, wherein the temperature of said reflector falls below said transformation temperature.

18. The reflector for space vehicle application as defined in claim 17, further comprising: a receiver of radiant energy, said receiver including an input, said input of said receiver being focused on said reflector for receiving radiant energy reflected from said reflector.

19. The reflector for space vehicle application as defined in claim 8, further comprising: a mounting member for said laminate, said mounting member being attached to said laminate film structure for supporting said laminate film structure to a space vehicle.

20. A method of producing a reflector comprising the steps of:
   draping a reflective membrane onto a support surface inside a sputtering chamber, said support surface defining the geometry of a reflector and the reflective surface of said reflective membrane being oriented face down against said support surface; and
   sputtering a shape memory alloy onto the outer surface of said reflective membrane to cover said surface and produce a laminate assembly of reflective membrane and shape memory alloy, said outer surface of said reflective membrane being opposite to said reflective surface.

21. The method of producing a reflector as defined in claim 20, further comprising the step, following the step of draping said reflective surface onto said support surface, of said heating shape memory alloy for sputtering and maintaining said heating during said step of sputtering.

22. The method of producing a reflector as defined in claim 20, further comprising the steps, following the step of draping said reflective surface onto said support surface, of raising the temperature of the shape memory alloy used for sputtering to a predetermined initial temperature at the commencement of said step of sputtering, and gradually raising said temperature in steps at various time intervals during said step of sputtering.

23. The method of producing a reflector as defined in claim 22, further comprising the step of cooling said laminate assembly, following the step of sputtering; and further comprising the step of manually deforming said laminate assembly into a compact shape, said compact shape being different than said shape of said reflector.

24. The method of forming a graded composition of a two metal alloy on a membrane, comprising
   heating the source of sputtering metals to a first temperature;
   sputtering two metals upon said membrane to deposit a metal alloy of the two metals on said membrane;
   increasing the heating of said source of sputtering metals incrementally to incrementally raise the temperature of said source while continuing said sputtering of said two metals to incrementally change the composition of said metal alloy being deposited, each said increment being maintained for a prescribed interval.

25. A method of making a reflector comprising the steps of:
   joining together a reflective film and layer of compositionally graded shape memory alloy into a unitary integral structure of a given geometry; and
   attaching a reflector support member to said unitary integral structure.

26. The method of making a reflector as defined in claim 25, further comprising:
   manually changing the geometry said unitary integral structure from said given geometry to a different geometry.

* * * * *